(12) United States Patent
Rajala

(10) Patent No.: US 7,430,401 B2
(45) Date of Patent: *Sep. 30, 2008

(54) NETWORK MONITORING METHOD FOR TELECOMMUNICATIONS NETWORK

(75) Inventor: Antti Rajala, Caracas (VE)

(73) Assignee: Nokia Corporation, Espoo (FI)

( * ) Notice: Subject to any disclaimer, the term of this patent is extended or adjusted under 35 U.S.C. 154(b) by 10 days.

This patent is subject to a terminal disclaimer.

(21) Appl. No.: 11/487,995

(22) Filed: Jul. 18, 2006

(65) Prior Publication Data

US 2006/0258348 A1  Nov. 16, 2006

Related U.S. Application Data

(63) Continuation of application No. 09/529,178, filed as application No. PCT/FI98/00794 on Oct. 13, 1998, now Pat. No. 7,142,820.

(30) Foreign Application Priority Data

Oct. 14, 1997  (FI) .................................... 973956

(51) Int. Cl.
*H04B 17/00* (2006.01)
*H04Q 7/20* (2006.01)

(52) U.S. Cl. ..................................... 455/67.7; 455/424

(58) Field of Classification Search ............. 455/67.11, 455/67.7, 410, 422.1, 423, 424, 560, 566; 379/1.01, 9, 9.03, 14.01, 33; 370/241; 340/500, 340/506
See application file for complete search history.

(56) References Cited

U.S. PATENT DOCUMENTS

| | | | |
|---|---|---|---|
| 5,566,092 A * | 10/1996 | Wang et al. | .................. 702/185 |
| 5,572,189 A | 11/1996 | Yamamoto et al. | |
| 5,621,664 A | 4/1997 | Phaal | |
| 5,923,247 A | 7/1999 | Dowden et al. | |
| 6,067,030 A | 5/2000 | Burnett et al. | |
| 6,118,936 A | 9/2000 | Lauer et al. | |
| 6,445,774 B1 | 9/2002 | Kidder et al. | |

FOREIGN PATENT DOCUMENTS

EP  0 529 207 A1  3/1993

(Continued)

OTHER PUBLICATIONS

J. Dean Brock, "Tingle: A Suite for Monitoring Networks," Proceedings of TRI COMM'91, IEEE Conference on Communications Software:Communications for Distributed Applications and Systems (Chapel Hill, NC), p. 234-241, (Apr. 18-19, 1991).

(Continued)

*Primary Examiner*—Quochien B Vuong
(74) *Attorney, Agent, or Firm*—Pillsbury Winthrop Shaw Pittman LLP

(57) ABSTRACT

This invention relates to monitoring and maintaining a network in telecommunications networks which comprise a large number of network elements. These network elements are presented as a hierarchical diagram or as a map display on a graphical user interface. The graphical user interface presents performance information of the network element as a graphical presentation in connection with the network element symbol in such a way that the operator can, at one glance, identify the network elements that are the most important in terms of operation of the network or the network elements most affected by faults. In accordance with an embodiment of the invention, the alarm situation of each element is displayed as a graphical presentation along with the network element symbol on the graphical user interface simultaneously with the graphical presentation representing the performance. In this manner, fault management FM and performance management PM are connected, whereby a link is provided between the faults and their effects on the telecommunications network or the network element.

4 Claims, 3 Drawing Sheets

FOREIGN PATENT DOCUMENTS

Figure 1:
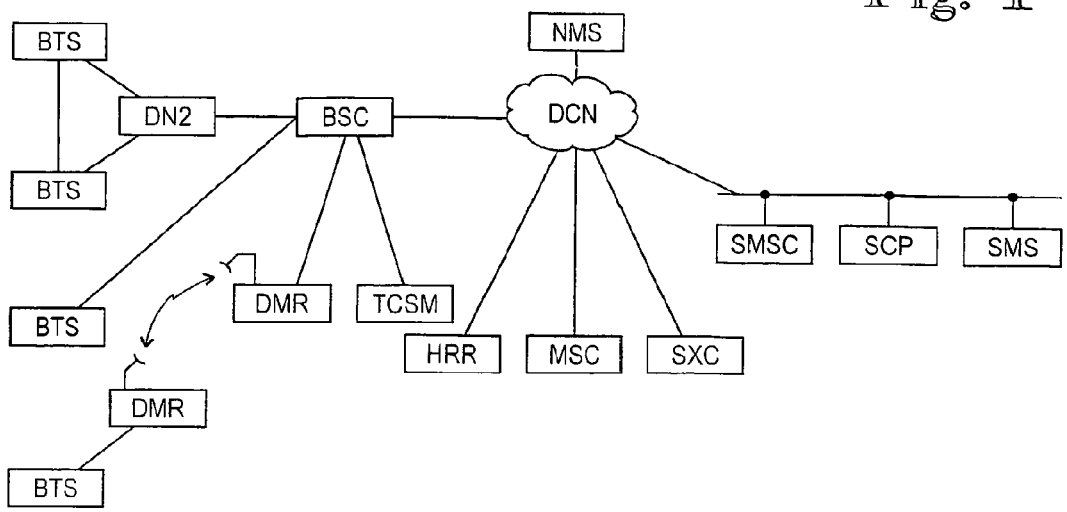

| | | |
|---|---|---|
| EP | 0 652 665 A2 | 5/1995 |
| EP | 0 849 911 A2 | 6/1998 |
| JP | 5-158878 | 6/1993 |
| JP | 09-223092 A | 8/1997 |
| WO | WO 94/28650 | 12/1994 |

OTHER PUBLICATIONS

Taesang Choi et al., "Enterprise Network Management: LAN Status Monitoring," IEEEE Conference on Communications 1995, p. 1448-1452, (Jun. 18-22, 1995).

* cited by examiner

NETWORK MONITORING METHOD FOR TELECOMMUNICATIONS NETWORK

This is a continuation of U.S. patent application Ser. No. 09/529,178, filed May 30, 2000 (now Allowed), which is the U.S. National Stage of International Application No. PCT/FI98/00794, filed Oct. 13, 1998, which, in turn, relies for priority upon Finnish Patent Application No. 973956, filed Oct. 14, 1997, the contents of all of which are hereby incorporated herein by reference in their entireties.

The present invention relates to monitoring and maintaining a network in telecommunications networks which comprise a large number of network elements.

Telecommunications network management consists of a large number of network operating tasks and network maintenance tasks. These tasks may be roughly divided into three areas: building the network, operating the network and developing the network.

The area of operating and maintaining the network covers the daily routines of network management. These include real-time monitoring of faults in the network, alarm handling, detection, localization and analysis of the faults, and repair tasks.

A typical telecommunications network is composed of a large number of network elements, including switching centres, base stations, transmission nodes, etc. A large network may be composed of tens of thousands of network elements. Each network element may in turn be composed of a number of independent units. Because of the complex nature of such a network concept, a large number of faults appear in the network every day, each fault manifesting itself with one or more alarms or without generating any alarms. A large network generates tens of thousands of alarms each day. A medium-sized GSM (Global System for Mobile Communication) network, for example, can be roughly estimated to generate 10 000 alarms a day.

In order to manage and monitor the network, one or more centralized network management systems (NMS) are provided in which alarms and other network management information are collected in a centralized manner and in which the network monitoring personnel can control the entire network by means of work stations. Information associated with the faults and alarms can be presented to the operator in different ways. One way is a graphical map presenting all network elements in their geographical locations and their alarm statuses. Such a graphical map display enables the operator to get a quick overview of the alarm situation of the network. In addition, text-based alarm monitoring applications are able to generate alarm information in a more detailed form.

Network fault management (FM) is currently based on monitoring alarms, evaluating their importance and effects and, accordingly, on initiating repairs. The importance of the alarms mainly depends on two factors: 1) the effect of the alarm on the performance of the network element, and 2) the importance of the network element. A problem in the existing applications is that the vast number of alarms, many being generated by the same fault, hinders the timely and efficient monitoring of faults. Another problem is that it is impossible to immediately get an overview of the effect of the fault on the performance of the network or the importance of the network element (for example the amount of lost traffic). Today, when alarms stream into a network management system, the operator examines, based on the operator's resources and experience, one alarm at a time and, if required, opens a remote MML session to the network element, possibly examines performance measurements available and estimates the gravity and effect of the fault on the performance of the network on the basis of the measurements. Today, it is extremely laborious and even impossible to prioritize faults and focus the repairs efficiently on the faulty network elements most dramatically hindering the performance of the network in terms of lost traffic and quality of service. On the other hand, it is also important to detect the faults that do not dramatically affect the performance of the network element or the network, whereby the repair work associated with these faults can be performed later, in connection with some other maintenance visit, for example. The above-mentioned fact is relevant, since a maintenance visit at the location site of the network element is an expensive procedure, particularly after normal office hours. In addition, the network element totally out of operation because of the fault may not even send an alarm, whereby the fault cannot be detected.

Besides alarms, a telecommunications network typically includes performance management (PM) measurements which are collected and transmitted from the network to the network management system. These measurements are transmitted, for example every 15, 30 or 60 minutes, every 6, 12 or 24 hours, and so on, depending on the network monitored, the capacity of the network management system and operator requirements. The measurements may involve call attempts, dropped or blocked calls and handover failure rates, for example.

Performance management PM has conventionally been an off-line procedure in which 24-hour data is collected and analyzed. This is a good way of detecting trends and problems in the telecommunications network, but the procedure is too slow for the real-time monitoring of the network.

An objective of the present invention is an on-line network monitoring method and system which assists the operator in more easily detecting faults and their effect on the operation of a telecommunications network and identifying the most important network elements in need of repair.

Network elements are presented as hierarchical diagrams or as a map display on a graphical user interface. In accordance with the invention, information on the performance of the network element is graphically presented on the graphical user interface in connection with a network element symbol in such a way that the operator can, at one glance, detect the network elements most essential to the operation of the network, or the network elements whose operation is most affected by the faults. In this manner, the most urgent and important targets of repair can be identified and the available resources can be primarily directed thereto. At the same time it is possible to detect alarms that can be ignored without dramatically degrading the performance of the network or the quality of service. Presenting performance information of the network elements also enables the localization of problems which do not send alarms (for example a sleeping base station). The invention also enables the detection and localization of problems otherwise invisible on a transmission path. Transmission elements of another operator, for example, cannot be directly monitored, but the invention enables the detection of the problem through the degraded performance of the operator's own network elements behind a failed connection.

According to an embodiment of the invention, the alarm situation of each network element is graphically displayed in connection with a network element symbol on the graphical user interface. The operator is thus able to get a quick overview of the alarm situation of the network. Simultaneously with the alarms of the network element, the graphical display also shows a graphical presentation of the invention, illustrating the performance of the network element. In this manner, fault management (FM) and performance management (PM) are combined, whereby a link is established between the faults and their effect on the telecommunications network or on the network element. Advantages so achieved are obvious: the operator does not need to follow the vast mass of alarms and to try to guess their effect on the network, since the effect of the alarms is clearly visible on the screen in the present invention. A number of improvements are hereby achieved: reduction of traffic losses caused by the faults because of rapid and accurately directed repairs, considerably less routine work and sheer guessing for the operator, fewer maintenance visits, a dramatically better overview of each level of performance of the network, a simpler manner of monitoring the network, and less need for training of the monitoring personnel.

There are various alternative types of performance values to be displayed. The performance of the network element may be presented as a relative deviation from the normal performance, for example. Since the graphical presentation of the network element shows, in addition to the deviation of the performance, the normal amount of traffic, the element having the most serious performance deficiency can then be easily detected, and the prioritization and order of urgency of repairs can be carried out rapidly. The graphical presentation may be implemented by symbolizing each network element on the graphical user interface by an object whose appearance, including shape, colour or size, changes according to the alarms and performance information.

In an embodiment of the invention, the current and the normal performance are shown as absolute values instead of relative values, and the amount of traffic, or an indicator which is proportional thereto, is used as a performance indicator. In that case, the absolute values of the normal performance of different network elements are comparable with one another, and so the relative importance of each network element for the traffic as compared with other elements can be seen on the graphical user interface. It is essential that the normal performance is used when a comparison is made of the importance between the network elements, since the current performance (possibly distorted by the faults) of the different elements does not give a true picture of their importance. On the other hand, when only the absolute normal performance is shown for the network elements, the network elements can be prioritized, but no information can be obtained on their internal situation.

In an embodiment of the invention, both the normal and the current absolute performance are shown, also indicating the internal situation of a network element, i.e. the current performance (for example traffic) as compared with the normal situation. With the help of these graphical presentations the operator can select, at one glance, the most important network elements having lost most of the performance to be repaired.

In an embodiment of the invention, the normal performance or traffic and the current performance or traffic are calculated, and when an average economic profit of traffic is known in a time unit, for example, an economic loss generated by the fault of the network element is calculated and shown to the operator in a time unit, for example. The loss may be presented as a numerical value or a graphical presentation as an absolute value, as a relative value, and so on. Repair tasks may be so prioritized that the faults generating the heaviest economic loss are repaired first.

In an embodiment of the invention, the normal performance of a network element is separately calculated for several times of the day, preferably for each hour of the day. In yet another embodiment of the invention, the normal performance is separately calculated for each day of the week and for several times of the day, preferably for each hour of the week. In this manner the variation in the normal performance and traffic according to the time of the day or the day of the week can be efficiently taken into account. A peak capacity time with a high dropped-call ratio may appear, for example, on Mondays from 1 p.m. to 2 p.m., whereas on Sundays from 8 a.m. to 9 a.m. there is less traffic with fewer dropped calls. If the average of the whole week was used as the normal performance, changes in the performance, caused by the normal variation of the amount of traffic, would be presented as significant deviations from the "normal" performance on the graphical user interface, which would make the monitoring more inaccurate. Since the normal performance calculated also varies in accordance with the invention according to the time of the day and/or the day of the week, the graphical presentation of the invention enables considerably more accurate detection of the alarm-induced degradation of the current performance as compared with the normal performance.

Figure 2:
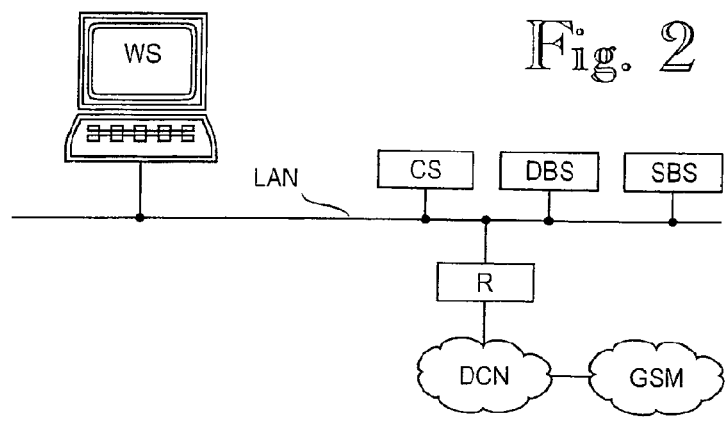
Figure 3:
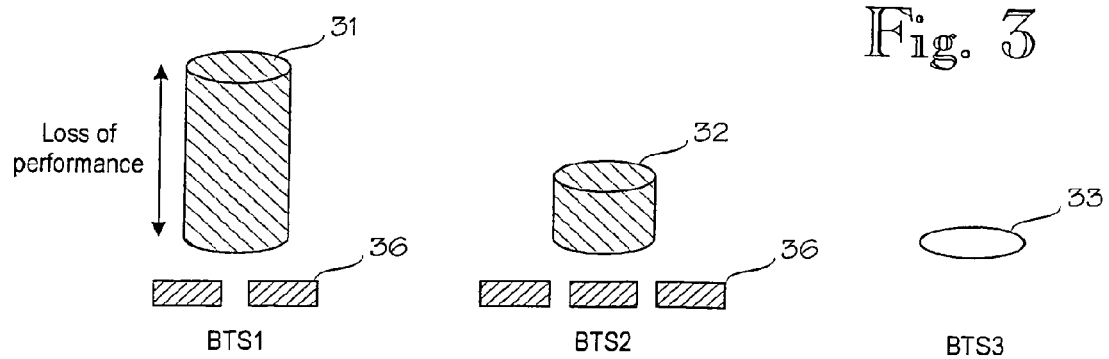
Figure 4:
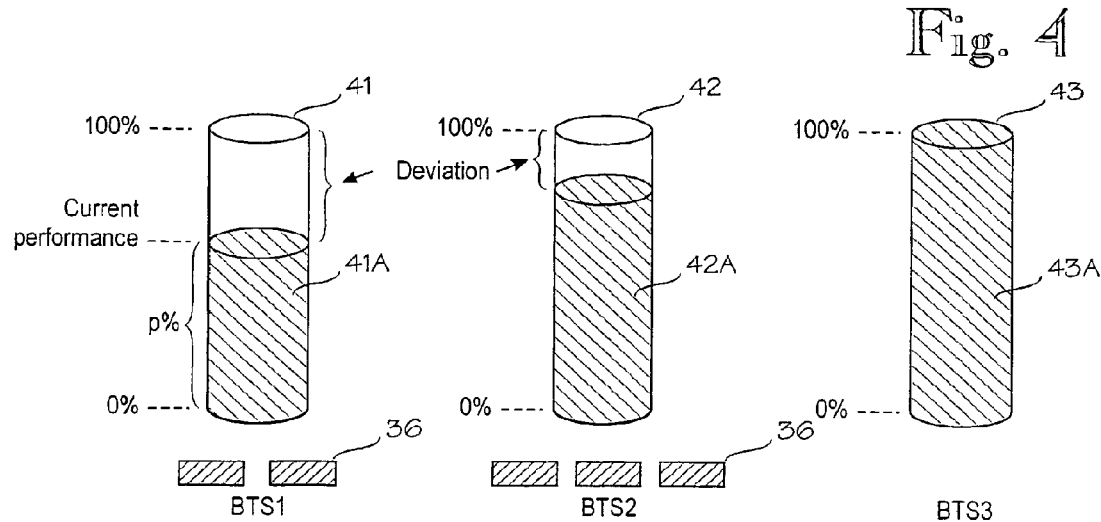
Figure 5:
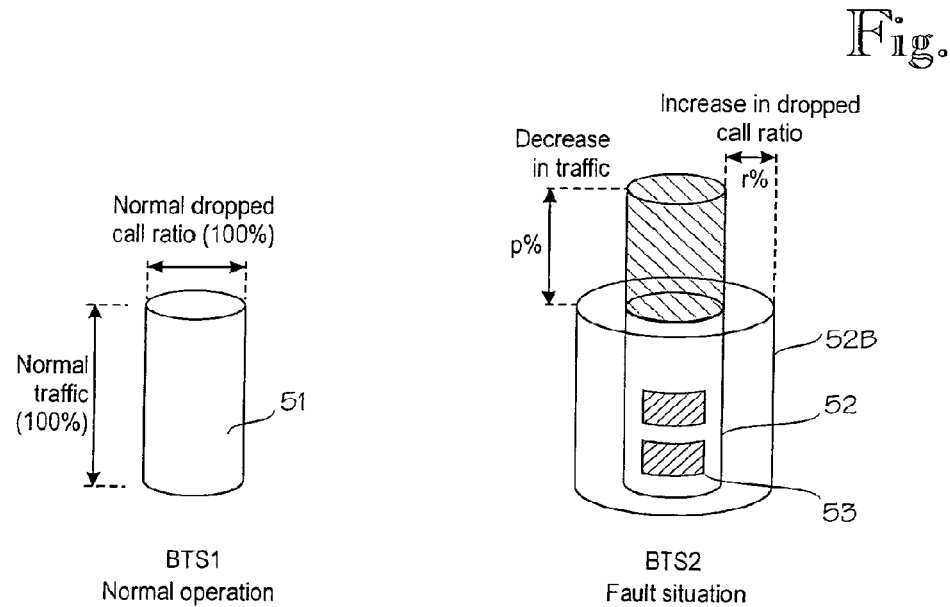
Figure 6:
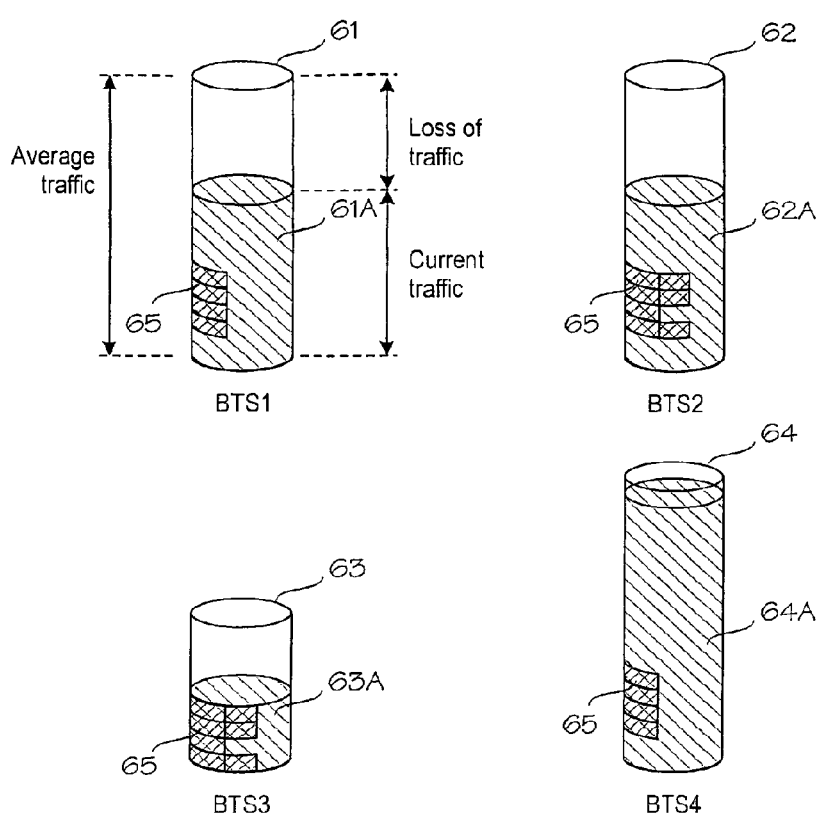
Figure 7:
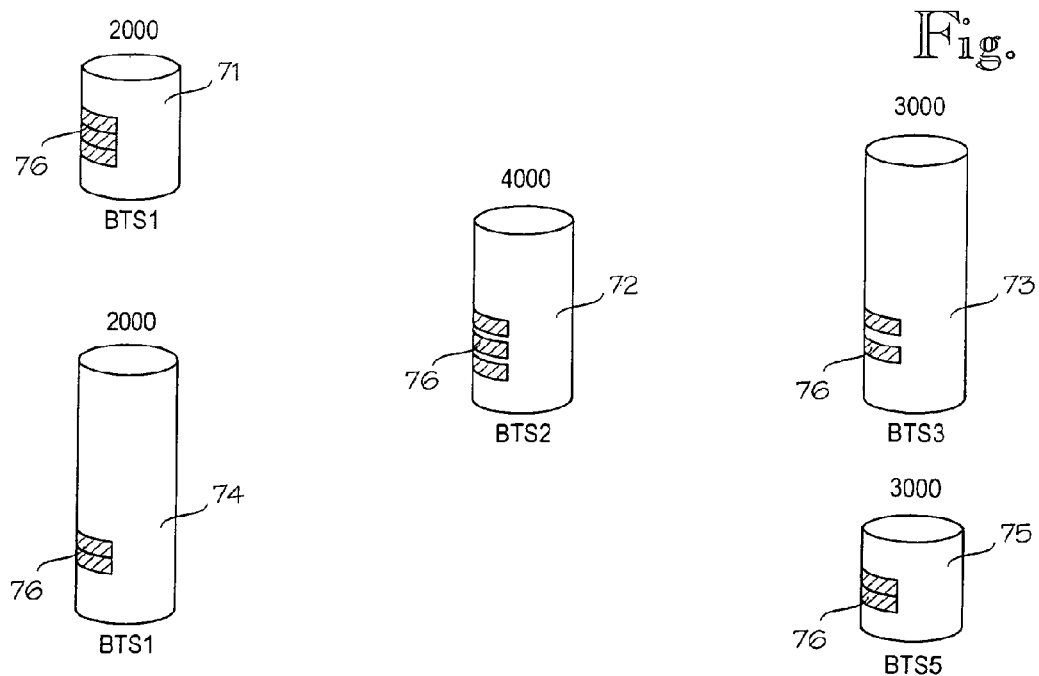

In the following, the invention will be described by means of preferred embodiments with reference to the accompanying drawings, in which:

FIG. 1 shows a telecommunications system having a network management system connected thereto, FIG. 2 illustrates the internal architecture of a network management system, FIGS. 3, 4, and 5 illustrate various graphical presentations of the relative deviation of performance, FIG. 6 illustrates a graphical presentation indicating the deviation of performance and the normal performance as absolute values, FIG. 7 illustrates a graphical presentation indicating the normal performance as an absolute value and an economic loss caused by a fault.

The present invention can be used for monitoring any telecommunications network (information network) in which network elements send performance measurement data and preferably also alarms. However, in the following, the preferred embodiments of the invention are described in connection with the European digital mobile communication system GSM (Global System for Mobile Communication), without, however, restricting the invention to it. The basic components and operation of the GSM system are disclosed in the ETSI/GSM recommendations. For a more detailed description of the GSM system a reference is made to these recommendations and to the publication "The GSM System for Mobile Communications", M. Mouly and M. Pautet, Palaiseau, France, 1992, ISPR:2-9507 19-0-7.

In FIG. 1, a network management system NMS is connected to network elements of a GSM mobile communication network via a data communication network DCN. In this connection, a data communication network refers to any connection or network by means of which the NMS and the network elements can be connected to one another. Packet switched networks PSN, PCN wires and local area network LAN connections or wide area network WAN connections are examples of feasible DCN implementations. The types of interfaces or protocols by means of which an MS communicates with the network elements are irrelevant to the invention. The interface or the protocol used may vary depending on the network element. In respect of the invention it is essential that alarms and performance measurement data can be sent from the network elements to the network management system NMS.

In the embodiment of FIG. 1, the NMS provides a centralized way of managing the following GSM network components: mobile services switching centres MSC including visitor location registers VLR; home location registers HLR including equipment identity registers EIR and authentication centres AC, base station controllers BSC; transcoder and submultiplexers TCSM; and base transceiver stations BTS.

The network management system NMS may also provide interfaces and basic monitoring for non-GSM network equipments. Such equipments include in FIG. 1 short message service centres SMSC, service cross-connections SXC, digital nodes DN2, digital microwave radios DMR, and so on. In addition, the NMS may be connected to intelligent network IN equipments, including a service control point SCP and a service management system SMS.

The hardware configuration and basic operation of the network management system may be similar to that of the known network management systems which are modified to implement the network monitoring operations of the invention. In the preferred embodiment of the invention, the network management system NMS is based on Nokia NMS/2000 by Nokia Telecommunications Oy, Finland. However, it must be noted that the present invention can be generally applied to any network management system collecting alarms and performance measurement data of a telecommunications network.

In the following, the hardware configuration of the network management system NMS according to the first preferred embodiment of the invention is illustrated by way of example. The NMS is composed of servers and operator seats which can be either application workstations or remote terminals. These devices are connected to the local area network LAN. If PC applications are in use, additional personal computers PC may be connected to the same LAN. In FIG. 1, the servers are composed of a telecommunications server CS, a data base server DBS and a standby server SBS, or a combination thereof. For a smaller telecommunications network, for example, the hardware configuration may comprise a standby server SBS and a combined telecommunications and database server.

The telecommunications server CS takes care of the data traffic between the network elements and the NMS. Data links to the data communication network DCN are handled via a separate mediation device R (for example a router) connected to the LAN. The database server DBS has a database to store network management data. A relational database may be used, for example. The database may be structured to separate tablespaces for different types of data: fault, performance and configuration data each have their own tablespaces. Each tablespace can be dimensioned separately according to the need at a given time.

The standby server SBS can take the role of either the database server or the telecommunication server in the event of failure of one or the other. This redundancy adds security to the system and facilitates upgrade processes.

The operator seats provide access to network management operations. An application workstation WS runs applications for managing the cellular network. The WS is provided with a graphical display. In addition, the WS can also operate as a client server for one or more remote terminals. All network management and monitoring tasks can be performed in a centralized manner through the work station WS or the remote terminals via the graphical user interface. The network elements to be managed can be presented in a hierarchical view which may also include real digitized maps showing the geographical locations of the network elements. In accordance with the basic principles of the invention, the alarm status and/or performance data of the network element are presented on the graphical user interface in connection with the network element.

The network elements send alarms to the network management system NMS in real time or in near-real time. The NMS continuously receives alarms from the network elements managed, the alarms being stored in the database server DBS and presented on the graphical user interface in the work station WS.

The network elements are presented as a hierarchical diagram or as a map display on the graphical user interface. In accordance with the invention, the alarm situation of each element is displayed as a graphical presentation (a symbol) in connection with the network element symbol. The alarms can be presented as coloured panels on a network element, for example. When the NMS receives an alarm from the network element, the coloured panel (or some other symbol) immediately appears in connection with the corresponding network element symbol on the graphical user interface. Arrival of an alarm cancellation (which is a typical operation) from the network to be monitored indicates that a particular alarm is no longer active, i.e. the fault situation has been cleared. When receiving the alarm cancellation, the NMS removes the coloured panel from the corresponding network element symbol on the graphical user interface. The colour of the panel may depend on the importance of the alarm. In the first preferred embodiment of the invention, the alarms are divided into three different categories according to the importance of the alarms: critical, major and minor, coloured red, orange and yellow, respectively. It is thus easy for the operator to get an overview of the alarm situation of the network.

Furthermore, in accordance with the invention, performance information of the network element is graphically presented on the graphical user interface in connection with the network element symbol in such a way that the operator is able to detect the most important network elements for the operation of the network or the network elements whose operation is most affected by the faults. In this manner, the most urgent and important targets of repair can be detected and the resources available can be primarily directed thereto. The performance information can be displayed concurrently with the alarms or without displaying the alarms. In the first case it is possible to detect alarms that can be ignored without dramatically degrading the performance of the network or the quality of service.

The NMS continuously receives performance measurement data PM from the network elements managed, and the measurement data is stored in the database server DBS. The network elements send PM measurement results at certain intervals depending on the network element, PM data type, telecommunications system, and so on. The measurement results may be sent, for example every 15, 30 or 60 minutes, every 6, 12 or 24 hours, and so on. There are several different measurements, but only a handful of them are considered important measurements being able to relatively accurately indicate the performance of the network. Such measurements can be called performance management PM indicators. Examples of suitable performance management indicators include measurements associated with the number of call attempts, dropper or blocked calls or handover failure rates. The PM indicator which best indicates the performance of the network at a given time depends on the network element, the type of telecommunications network, and so on. The network operator can select the PM indicators or a combination thereof best suitable for its purposes.

The NMS is able to calculate a normal value, a current value and/or a relative or an absolute deviation from the normal value. The current value, i.e. the current performance, may be the measurement value obtained from the last measurement report, or it can be the mean value of the PM indicator values collected over a short period of time covering a period of an hour, for example. The normal value, i.e. the normal performance, may be the mean value of the PM indicator values collected over a longer measurement period, preferably covering a period of several weeks, for example.

Let us next study by way of example the calculation of the deviation from the PM measurement results. The NMS receives the PM measurement results that are not processed by the network element, and possibly preprocesses them by converting them into ASCII tables, for example. Next, the NMS may calculate key performance indicators KPI from the different measurements or directly apply the PM measurement results. Next, the NMS calculates a new deviation (either the PM measurement result or the KPI derived therefrom) from the old normal value (the mean value) stored in the database DBS, and stores the deviation in the deviation table in the database DBS. The database includes a normal value for each hour of the week, and the normal value used at a given time is selected according to the hour of the week. Next, the NMS removes the oldest measurement result or the KPI value from the normal value calculation database (having N locations) and adds the latest value therein. Next, the NMS calculates a new normal value as the mean value of the N values in the calculation database and stores it. Finally, the NMS updates the corresponding PM graphical presentation of the network element on the graphical user interface.

The procedure presented above is performed to the network element each time PM measurement results concerning the network element are received. As mentioned above, this may take place every 15, 30 or 60 minutes, for example. The alarms were presented in real time, whereas the PM deviations are presented in quasi-real time on the graphical user interface. The normal value can be calculated for each different PM measurement (for example traffic and blocked calls), for each hour of the week, for example. This requires a vast amount of calculation capacity and database capacity. For example, if two PM measurements (for example traffic and blocked calls) are observed and a telecommunications network includes 1000 network elements, then 2*1000*24*7=336000 data sets are stored in the database DBS.

The NMS may use the graphical user interface for presenting at least one of the following performance information items to each network element and to one or more PM indicators (measurement): a normal value, a current value and/or a relative value or an absolute deviation from the normal value. The performance is preferably graphically presented in connection with the network element symbol. For example, the graphical presentation may be so implemented that on the graphical user interface, each network element is symbolized by an object whose appearance, including shape, colour and size, varies according to the performance information and alarms.

FIG. 3 illustrates one way of implementing a graphical presentation of the relative deviation or the absolute deviation. A column is displayed in connection with each network element (columns 31, 32 and 33 of base stations BTS1, BTS2 and BTS3). The height of the columns indicates the absolute deviation from the normal value. The colour of the column may also change with an increase in deviation so that large deviations are more easily visible on the screen. If no column exists, the performance is within the normal value. It is also possible to display alarms in connection with the deviation columns as coloured panels 36, for example. Presenting only the performance deviation informs the operator of the network elements with the lowest performance, but does not in any other way- prioritize the network elements. In that case, repairs can be first directed to these network elements. If the performance is degraded but no alarms appear, the network element may not be able to send the alarms because of the fault, or the degraded performance is caused by malfunction of some other element and cannot be directly seen on the screen. Monitoring the performance according to the invention thus enables the detection of different types of hidden faults.

FIG. 4 illustrates a second way of displaying the current relative performance in relation to the normal performance. Columns 41, 42 and 43 in FIG. 4 present the normal performance (100%) for base stations BTS1, BTS2 and BTS2. A coloured column 41A, 42A and 43A inside the column indicates the current performance in per cent (p %) from the normal performance. In that case, the relative deviation is 100-p %. Such a presentation makes it easier for the operator to perceive the level of deviation from the normal value. The lower the coloured column, the more degraded the performance. In addition, it is also possible to present the alarms in the form of alarm panels 36, for example. The columns 41 to 43 are of equal height, and it is therefore impossible to prioritize the network elements on the basis thereof.

It is to be noted that in accordance with the invention it is possible to present an arbitrary number of performance management indicators. FIG. 5 illustrates one way of presenting the relative deviation when two PM indicators, namely the amount of traffic (for example calls in a time unit) and a dropped call ratio, are simultaneously in use. Columns 51 and 52 show normal performance values: height represents 100% traffic and diameter represents 100% dropped call ratio. The base station BTS1 has a normal situation, and only the column 51 is therefore presented on the graphical user interface. The base station BTS2 has a fault situation which has also caused fault alarms shown in coloured panels on the performance column. Traffic has reduced p % because of the fault, the reduction being indicated by a coloured extension 52A of the column 52, both having the same diameter. The height of the extension 52A is directly proportional to the reduction of traffic. At the same, the dropped call ratio has also increased r %, this being indicated by an increase in diameter 52B of the column 52 and possibly by a change in colour. The increase in diameter is directly proportional to an increase in drop call ratio. The operator thus sees the faulty network element by a change in shape and colour and by an increase in size, which considerably facilitates the detection of the network element in need of repair from the vast amount of elements on the screen. The columns 51 and 52 are of equal height, whereby it is impossible to prioritize the network elements on the basis thereof.

It is also possible to present the current and the normal performance as absolute values instead of relative values. The absolute values of different network elements are comparable with one another, and the relative importance of each network element as compared with one another can thus be seen on the graphical user interface. However, such a comparison of the absolute values is sensible only if the amount of traffic, or an indicator corresponding thereto, is used as the performance indicator. In addition, the current and the normal performance presented inform the operator of the current performance (for example traffic) as compared with the normal situation. These graphical presentations enable the operator to select, at one glance, the most important network elements having lost most of their performance to be repaired.

FIG. 6 illustrates one way of presenting the normal performance, the current performance and the deviation as absolute values. The heights of columns 61, 62, 63 and 64 represent their absolute performance, normal traffic, for example. Therefore, the height of the column directly indicates the importance of the network element for traffic in proportion to others. In FIG. 6, the order of importance for the traffic is BTS1, BTS4, BTS2 and BTS3. Coloured columns 61A, 62A, 63A and 64A inside the columns 61 to 64 indicate the current performance (traffic). Consequently, it is also possible to see the effect of the fault on the performance of the network element. In FIG. 6, the order of repair would be BTS1, BTS2, BTS3 and BTS4 on the basis of the loss of the absolute performance. The order would be entirely different on the basis of the loss of the relative performance: BTS3, BTS1, BTS2 and BTS4. On the other hand, the order would be BTS2, BTS3, BTS1 and BTS4 on the basis of the number of alarms. The operator can thus receive a great amount of information at one glance, on the basis of which the operator is able to conclude the order of repair. The order of repair in FIG. 6 would most likely be BTS1, BTS3, BTS2 and BTS4.

FIG. 7 illustrates a way of presenting only the absolute value of the normal performance. The height of columns 71, 72, 73 74 and 75 in FIG. 7 shows their amount of traffic and, consequently, their order of importance. In addition, the alarms are shown as coloured panels 76, for example. However, this embodiment does not take into account the actual loss of performance.

In an embodiment of the invention, the normal performance or traffic and the current performance or traffic are calculated and when the average profit of the traffic, i.e. the financial value (in a performance unit and/or in a time unit, for example) is known, the economical loss (for example in a time unit) generated by the network element is calculated and presented to the operator if the fault is not observed. The loss can be presented as a numerical value or a graphical presentation as an absolute value, as a relative value, and so on. FIG. 7 shows the fault-induced loss in hours (for example FIM/hour) on top of the columns. On this ground the network element generating the heaviest losses can be selected to be repaired. A similar way of presenting the loss can be applied to other graphical presentations representing the performance or solely to alarms without other performance information included.

It is to be noted that the above description discloses only some ways of presenting the performance information of the network elements for monitoring and analyzing faults. Various changes and modifications are obvious to those skilled in the art without deviating from the scope and spirit of the invention disclosed in the attached claims.

The invention claimed is:

1. A network monitoring method for a telecommunications network which comprises a large number of network elements, the method comprising:
   collecting, in a centralized manner, network-element-specific performance information,
   calculating a normal performance and a current performance of each network element, and
   displaying a graphical presentation for each network element on a graphical user interface, the graphical presentation indicating the current performance of the network element in relation to the normal performance.

2. The method of claim 1, further comprising calculating a normal performance of the network element for each day of the week and/or for several times of the day, and using the normal performance corresponding to the current day of the week and/or the time of the day as said normal performance.

3. The method of claim 1, further comprising collecting, in a centralized manner, alarms coming from the network elements, and presenting the alarms as network-element-specific graphical presentations on the graphical user interface.

4. The method of claim 3, further comprising displaying a graphical presentation representing the performance of each network element simultaneously with the alarms of the respective network element on a digital map on said graphical user interface.

* * * * *